US006291613B1

(12) United States Patent
Ford et al.

(10) Patent No.: US 6,291,613 B1
(45) Date of Patent: Sep. 18, 2001

(54) PROCESS FOR THE POLYMERIZATION OF OLEFINS

(75) Inventors: Randal Ray Ford; Richard Kingsley Stuart, Jr., both of Longview, TX (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/387,601

(22) Filed: Aug. 31, 1999

Related U.S. Application Data

(60) Provisional application No. 60/105,786, filed on Oct. 27, 1998.

(51) Int. Cl.[7] ................................ C08F 4/60; C08F 10/00
(52) U.S. Cl. ...................... 526/138; 526/125.8; 526/142; 526/144; 526/147; 526/236; 526/901
(58) Field of Search ...................... 526/74, 125.8, 526/138, 147, 236, 901, 142, 144

(56) References Cited

U.S. PATENT DOCUMENTS

| Re. 33,683 | 9/1991 | Allen et al. . |
| 3,113,115 | 12/1963 | Ziegler et al. . |
| 3,594,330 | 7/1971 | Delbouille et al. . |
| 3,644,318 | 2/1972 | Diedrich et al. . |
| 3,676,415 | 7/1972 | Diedrich et al. . |
| 3,709,853 | 1/1973 | Karapinka . |
| 3,917,575 | 11/1975 | Matsuura et al. . |
| 4,003,712 | 1/1977 | Miller . |
| 4,011,382 | 3/1977 | Levine et al. . |
| 4,012,573 | 3/1977 | Trieschmann et al. . |
| 4,070,419 | * 1/1978 | Watson ................................ 526/77 X |
| 4,105,847 | 8/1978 | Ito et al. . |
| 4,148,754 | 4/1979 | Strobel et al. . |
| 4,187,385 | 2/1980 | Iwao et al. . |
| 4,256,866 | 3/1981 | Karayannis et al. . |
| 4,293,673 | 10/1981 | Hamer et al. . |
| 4,296,223 | 10/1981 | Berger . |
| 4,298,713 | 11/1981 | Morita et al. . |
| 4,302,565 | 11/1981 | Goeke et al. . |
| 4,302,566 | 11/1981 | Karol et al. . |
| 4,311,752 | 1/1982 | Diedrich et al. . |
| 4,363,904 | 12/1982 | Fraser et al. . |
| 4,481,301 | 11/1984 | Nowlin et al. . |
| 4,543,399 | 9/1985 | Jenkins, III et al. . |
| 4,659,685 | 4/1987 | Coleman et al. . |
| 4,695,558 | 9/1987 | Albizzati et al. . |
| 4,882,400 | 11/1989 | Dumain et al. . |
| 5,055,535 | 10/1991 | Spitz et al. . |
| 5,258,475 | 11/1993 | Kissin . |
| 5,352,749 | 10/1994 | DeChellis et al. . |
| 5,410,002 | 4/1995 | Govoni et al. . |
| 5,470,812 | 11/1995 | Mink et al. . |
| 5,541,270 | 7/1996 | Chinh et al. . |
| 5,883,203 | * 3/1999 | Cheruvu et al. ...................... 526/129 |

FOREIGN PATENT DOCUMENTS

| 839380 | 9/1976 | (BE) . |
| 991798 | 6/1976 | (CA) . |
| 0 435 514 | 7/1991 | (EP) . |
| 0 529 977 A1 | 3/1993 | (EP) . |
| 0 703 246 A1 | 3/1996 | (EP) . |
| 851113 | 10/1960 | (GB) . |
| 46-38975 | * 11/1971 | (JP) ..................................... 526/142 |

OTHER PUBLICATIONS

Hackh's Chem. Dictionary, 4th ed., McGraw–Hill, N.Y., 461–2, 1969.*
*Chemical Engineering News*, 1985, p. 27, vol. 63, Issue 5.

* cited by examiner

*Primary Examiner*—Fred Teskin
(74) *Attorney, Agent, or Firm*—Jonathan D. Wood; Bernard J. Graves, Jr.

(57) ABSTRACT

A novel process for the polymerization of olefins is provided. The process involves contacting at least one olefin with a Ziegler-Natta catalyst in the presence of dinitrogen monoxide in the production of polymeric products having a narrower molecular weight distribution. A process for narrowing molecular weight distribution of polyolefins utilizing dinitrogen monoxide is also provided.

42 Claims, No Drawings

PROCESS FOR THE POLYMERIZATION OF OLEFINS

CROSS-REFERENCE TO RELATED APPLICATION

This application claims priority under 35 U.S.C. §119(e) to U.S. Provisional Application Ser. No. 60/105,786, filed Oct. 27, 1998.

FIELD OF INVENTION

The present invention relates to a process for the polymerization of olefins and narrowing molecular weight distribution (MWD) of polyolefins. Polyethylenes produced in accordance with the process of the present invention are generally characterized further by having a reduced n-hexane soluble polymeric fraction.

BACKGROUND OF INVENTION

Catalyst systems for the polymerization of olefins are well known in the art and have been known at least since the issuance of U.S. Pat. No. 3,113,115. Thereafter, many patents have been issued relating to new or improved Ziegler-Natta catalysts. Exemplary of such patents are U.S. Pat. Nos. 3,594,330; 3,676,415; 3,644,318; 3,917,575; 4,105,847; 4,148,754; 4,256,866; 4,298,713; 4,311,752; 4,363,904; 4,481,301 and Reissue 33,683.

These patents disclose Ziegler-Natta catalysts that are well known as typically consisting of a transition metal component and a co-catalyst that is typically an organoaluminum compound. Optionally, used with the catalyst are activators such as halogenated hydrocarbons and activity modifiers such as electron donors.

The use of halogenated hydrocarbons with titanium-based Ziegler-Natta polymerization catalysts in the production of polyethylene is disclosed in European Patent Applications EP A 0 529 977 A1 and EP 0 703 246 A1. As disclosed, the halogenated hydrocarbons may reduce the rate of ethane formation, improve catalyst efficiency, or provide other effects. Typical of such halogenated hydrocarbons are monohalogen and polyhalogen substitutes of saturated or unsaturated aliphatic, alicyclic, or aromatic hydrocarbons having 1 to 12 carbon atoms. Exemplary aliphatic compounds include methyl chloride, methyl bromide, methyl iodide, methylene chloride, methylene bromide, methylene iodide, chloroform, bromoform, iodoform, carbon tetrachloride, carbon tetrabromide, carbon tetraiodide, ethyl chloride, ethyl bromide, 1,2-dichloroethane, 1,2-dibromoethane, methylchloroform, perchloroethylene and the like. Exemplary alicyclic compounds include chlorocyclopropane, tetrachlorocyclopentane and the like. Exemplary aromatic compounds include chlorobenzene, hexabromobenzene, benzotrichloride and the like. These compounds may be used individually or as mixtures thereof.

It is also well known, in the polymerization of olefins, particularly where Ziegler-Natta catalysts are employed, to utilize, optionally, electron donors. Such electron donors often aid in increasing the efficiency of the catalyst and/or in controlling the stereospecificity of the polymer when an olefin, other than ethylene, is polymerized. Electron donors, typically known as Lewis Bases, can be employed during the catalyst preparation step, referred to as internal electron donors, or during the polymerization reaction when the catalyst comes into contact with the olefin or olefins, referred to as external electron donors.

The use of electron donors in the field of propylene polymerization is well known and is primarily used to reduce the atactic form of the polymer and increase the production of the iosotactic polymers. However, while improving the production of isotactic polypropylene, electron donors tend, generally, to reduce the productivity of the Ziegler-Natta catalyst.

In the field of ethylene polymerization, where ethylene constitutes at least about 50% by weight of the total monomers present in the polymer, electron donors are utilized to control the molecular weight distribution (MWD) of the polymer and the activity of the catalyst in the polymerization medium. Exemplary patents describing the use of internal electron donors in producing polyethylene are U.S. Pat. Nos. 3,917,575; 4,187,385, 4,256,866; 4,293,673; 4,296,223; Reissue 33,683; 4,302,565; 4,302,566; and 5,470,812. The use of an external electron donor to control molecular weight distribution is shown in U.S. Pat. No. 5,055,535; and the use of external electron donors to control the reactivity of catalyst particles is described in U.S. Pat. No. 5,410,002.

Illustrative examples of electron donors include carboxylic acids, carboxylic acid esters, alcohols, ethers, ketones, amines, amides, nitrites, aldehydes, alcoholates, thioethers, thioesters, carbonic esters, organosilicon compounds containing oxygen atoms, and phosphorus, arsenic or antimony compounds connected to an organic group through a carbon or oxygen atom.

SUMMARY OF THE INVENTION

The process of the present invention comprises polymerizing at least one olefin in the presence of at least one Ziegler-Natta catalyst comprised of a component comprising at least one transition metal and a co-catalyst comprising at least one organometallic compound, and a sufficient amount of dinitrogen monoxide ($N_2O$) to obtain an olefin homopolymer or interpolymer having a narrower molecular weight distribution than would be obtained in the absence of dinitrogen monoxide.

Also provided is a process for narrowing molecular weight distribution of a polymer comprising at least one or more olefin(s) comprising contacting under polymerization conditions, at least one or more olefin(s) with at least one Ziegler-Natta catalyst comprised of a component comprising at least one transition metal and a co-catalyst comprising at least one organometallic compound, and dinitrogen monoxide ($N_2O$), wherein the dinitrogen monoxide is present in an amount sufficient that the molecular weight distribution of the resulting polymeric product is narrower than would be obtained in the absence of the dinitrogen monoxide.

All mention herein to elements of Groups of the Periodic Table are made in reference to the Periodic Table of the Elements, as published in "Chemical and Engineering News", 63(5), 27, 1985. In this format, the Groups are numbered 1 to 18.

In carrying out the novel polymerization process of the present invention, there may optionally be added any electron donor(s) and/or any halogenated hydrocarbon compound(s).

DETAILED DESCRIPTION OF THE INVENTION

The process of the present invention comprises polymerizing at least one olefin in the presence of at least one Ziegler-Natta catalyst comprised of a component comprising at least one transition metal and a co-catalyst comprising at least one organometallic compound, and a sufficient amount of dinitrogen monoxide ($N_2O$) to obtain an olefin homopolymer or interpolymer having a narrower molecular weight distribution than would be obtained in the absence of dinitrogen monoxide.

Also provided is a process for narrowing molecular weight distribution of a polymer comprising at least one or more olefin(s) comprising contacting under polymerization conditions, at least one or more olefin(s) with at least one Ziegler-Natta catalyst comprised of a component comprising at least one transition metal and a co-catalyst comprising at least one organometallic compound, and dinitrogen monoxide ($N_2O$), wherein the dinitrogen monoxide is present in an amount sufficient that the molecular weight distribution of the resulting polymeric product is narrower than would be obtained in the absence of the dinitrogen monoxide.

The polymerization of the at least one olefin herein may be carried out using any suitable process. For example, there may be utilized polymerization in suspension, in solution or in the gas phase media. All of these polymerization processes are well known in the art.

A particularly desirable method for producing polyethylene polymers according to the present invention is a gas phase polymerization process. This type process and means for operating the polymerization reactor are well known and completely described in U.S. Pat. Nos. 3,709,853; 4,003,712; 4,011,382; 4,012,573; 4,302,566; 4,543,399; 4,882,400; 5,352,749; 5,541,270; Canadian Patent No. 991,798 and Belgian Patent No. 839,380. These patents disclose gas phase polymerization processes wherein the polymerization zone is either mechanically agitated or fluidized by the continuous flow of the gaseous monomer and diluent. The entire contents of these patents are incorporated herein by reference.

In general, the polymerization process of the present invention may be effected as a continuous gas phase process such as a fluid bed process. A fluid bed reactor for use in the process of the present invention typically comprises a reaction zone and a so-called velocity reduction zone. The reaction zone comprises a bed of growing polymer particles, formed polymer particles and a minor amount of catalyst particles fluidized by the continuous flow of the gaseous monomer and diluent to remove heat of polymerization through the reaction zone. Optionally, some of the recirculated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The said gas is passed through a heat exchanger wherein the heat of polymerization is removed, compressed in a compressor and then returned to the reaction zone.

In more detail, the reactor temperature of the fluid bed process herein ranges from about 30° C. to about 150° C. In general, the reactor temperature is operated at the highest temperature that is feasible taking into account the sintering temperatures of the polymer product within the reactor.

The process of the present invention is suitable for the polymerization of at least one or more olefins. The olefins, for example, may contain from 2 to 16 carbon atoms. Included herein are homopolymers, copolymers, terpolymers, and the like of the olefin monomeric units. Particularly preferred for preparation herein by the process of the present invention are polyethylenes. Such polyethylenes are defined as homopolymers of ethylene and copolymers of ethylene and at least one alpha-olefin wherein the ethylene content is at least about 50% by weight of the total monomers involved. Exemplary alpha-olefins that may be utilized herein are propylene, 1-butene, 1-pentene, 1-hexene, 1-heptene, 1-octene, 4-methyl-1-pentene, 1-decene, 1-dodecene, 1-hexadecene and the like. Also utilizable herein are polyenes such as 1,3-hexadiene, 1,4-hexadiene, 1,5-hexadiene, cyclopentadiene, dicyclopentadiene, 4-vinylcyclohex-1-ene, 1,5-cyclooctadiene, 5-vinylidene-2-norbornene, 5-vinyl-2-norbornene, and olefins formed in situ in the polymerization medium. When olefins are formed in situ in the polymerization medium, the formation of polyethylenes containing long chain branching may occur.

The polymerization reaction of the present invention is carried out in the presence of at least one Ziegler-Natta catalyst. In the process of the invention, the catalyst can be introduced in any manner known in the art. For example, the catalyst can be introduced directly into the fluidized bed reactor in the form of a solution, a slurry or a dry free flowing powder. The catalyst can also be used in the form of a deactivated catalyst, or in the form of a prepolymer obtained by contacting the catalyst with one or more olefins.

The Ziegler-Natta catalysts utilized herein are well known in the industry. The Ziegler-Natta catalysts in the simplest form are comprised of a component comprising at least one transition metal and a co-catalyst comprising at least one organometallic compound. The metal of the transition metal component is a metal of Groups 4, 5, 6, 7, 8, 9 and 10 of the Periodic Table of the Elements, as published in "Chemical and Engineering News", 63(5), 27, 1985. In this format, the groups are numbered 1–18. Exemplary of such transition metals are titanium, zirconium, vanadium, chromium, manganese, iron, cobalt, nickel, and the like, and mixtures thereof. In a preferred embodiment the transition metal is selected from the group consisting of titanium, zirconium, vanadium and chromium, and in a still further preferred embodiment, the transition metal is titanium. The Ziegler-Natta catalyst can optionally contain magnesium and/or chlorine. Such magnesium and chlorine containing catalysts may be prepared by any manner known in the art.

The co-catalyst used in the process of the present invention can be any organometallic compound, or mixtures thereof, that can activate the transition metal component in a Ziegler-Natta catalyst in the polymerization of olefins. In particular, the organometallic co-catalyst compound that is reacted with the transition metal component contains a metal of Groups 1, 2, 11, 12, 13 and/or 14 of the above described Periodic Table of the Elements. Exemplary of such metals are lithium, magnesium, copper, zinc, boron, silicon and the like, and mixtures thereof.

Preferably the co-catalyst is at least one compound of the formula, $$X_nER_{3-n},$$

or mixtures thereof,
wherein,
X is hydrogen, halogen, or mixtures of halogens, selected from fluorine, chlorine, bromine and iodine;
n ranges from 0 to 2;

E is an element from Group 13 of the Periodic Table of Elements such as boron, aluminum and gallium; and R is a hydrocarbon group, containing from 1 to 100 carbon atoms and from 0 to 10 oxygen atoms, connected to the Group 13 element by a carbon or oxygen bond.

Exemplary of the R group suitable for use herein is $C_{1-100}$ alkyl, $C_{1-100}$ alkoxy, $C_{2-100}$ alkenyl, $C_{4-100}$ dienyl, $C_{3-100}$ cycloalkyl, $C_{3-100}$ cycloalkoxy, $C_{3-100}$ cycloalkenyl, $C_{4-100}$ cyclodienyl, $C_{6-100}$ aryl, $C_{7-100}$ aralkyl, $C_{7-100}$ aralkoxy and $C_{7-100}$ alkaryl. Also exemplary of the R group are hydrocarbons containing from 1 to 100 carbon atoms and from 1 to 10 oxygen atoms.

Exemplary of the co-catalyst used in the process of the present invention where n=0 are trimethylaluminum; triethylborane; triethylgallane; triethylaluminum; tri-n-propylaluminum; tri-n-butylaluminum; tri-n-pentylaluminum; triisoprenylaluminum; tri-n-hexylaluminum; tri-n-heptylaluminum; tri-n-octylaluminum; triisopropylaluminum; triisobutylaluminum; tris(cylcohexylmethyl)aluminum; dimethylaluminum methoxide; dimethylaluminum ethoxide; diethylaluminum ethoxide and the like. Exemplary of compounds where n=1 are dimethylaluminum chloride; diethylaluminum chloride; di-n-propylaluminum chloride; di-n-butylaluminum chloride; di-n-pentylaluminum chloride; diisoprenylaluminum chloride; di-n-hexylaluminum chloride; di-n-heptylaluminum chloride; di-n-octylaluminum chloride; diisopropylaluminum chloride; diisobutylaluminum chloride; bis(cylcohexylmethyl) aluminum chloride; diethylaluminum fluoride; diethylaluminum bromide; diethylaluminum iodide; dimethylaluminum hydride; diethylaluminum hydride; di-n-propylaluminum hydride; di-n-butylaluminum hydride; di-n-pentylaluminum hydride; diisoprenylaluminum hydride; di-n-hexylaluminum hydride; di-n-heptylaluminum hydride; di-n-octylaluminum hydride; diisopropylaluminum hydride; diisobutylaluminum hydride; bis(cylcohexylmethyl)aluminum hydride; chloromethylaluminum methoxide; chloromethylalurninum ethoxide; chloroethylaluminum ethoxide and the like. Exemplary of compounds where n=2 are methylaluminum dichloride; ethylaluminum dichloride; n-propylaluminum dichloride; n-butylaluminum dichloride; n-pentylaluminum dichloride; isoprenylaluminum dichloride; n-hexylaluminum dichloride; n-heptylaluminum dichloride; n-octylaluminum dichloride; isopropylaluminum dichloride; isobutylaluminum dichloride; (cylcohexylmethyl)aluminum dichloride and the like. Also exemplary are alkylaluminum sesquialkoxides such as methylaluminum sesquimethoxide; ethylaluminum sesquiethoxide; n-butylaluminum sesqui-n-butoxide and the like. Also exemplary are alkylaluminum sesquihalides such as methylaluminum sesquichloride; ethylaluminum sesquichloride; isobutylaluminum sesquichloride; ethylaluminum sesquifluoride; ethylaluminum sesquibromide; ethylaluminum sesquiiodide and the like.

Preferred for use herein as co-catalysts are trialkylaluminums such as trimethylaluminum, triethylaluminum, tri-n-propylaluminum, tri-n-butylaluminum, triisobutylaluminum, tri-n-hexylaluminum, triisohexylaluminum, tri-2-methylpentylaluminum, tri-n-octylaluminum, tri-n-decylaluminum; and dialkylaluminum halides such as dimethylaluminum chloride, diethylaluminum chloride, dibutylaluminum chloride, diisobutylaluminum chloride, diethylaluminum bromide and diethylaluminum iodide; and alkylaluminum sesquihalides such as methylaluminum sesquichloride, ethylaluminum sesquichloride, n-butylaluminum sesquichloride, isobutylaluminum sesquichloride, ethylaluminum sesquifluoride, ethylaluminum sesquibromide and ethylaluminum sesquiiodide.

Most preferred for use herein as co-catalysts are trialkylaluminums such as trimethylaluminum, triethylaluminum, tri-n-propylaluminum, tri-n-butylaluminum, triisobutylaluminum, tri-n-hexylaluminum, triisohexylaluminum, tri-2-methylpentylaluminum, tri-n-octylaluminum and dialkylaluminum halides such as dimethylaluminum chloride, diethylaluminum chloride, dibutylaluminum chloride, diisobutylaluminum chloride and alkylaluminum sesquihalides such as methylaluminum sesquichloride, ethylaluminum sesquichloride, n-butylaluminum sesquichloride and isobutylaluminum sesquichloride.

Mixtures of compounds of the above formula $X_nER_{3-n}$ also can be utilized herein as the co-catalyst.

Any or all of the components of the Ziegler-Natta catalyst can be supported on a carrier. The carrier can be any particulate organic or inorganic material. Preferably the carrier particle size should not be larger than about 200 microns in diameter. The most preferred particle size of the carrier material can be easily established by experiment. Preferably, the carrier should have an average particle size of 5 to 200 microns in diameter, more preferably 10 to 150 microns and most preferably 20 to 100 microns.

Examples of suitable inorganic carriers include metal oxides, metal hydroxides, metal halogenides or other metal salts, such as sulphates, carbonates, phosphates, nitrates and silicates. Exemplary of inorganic carriers suitable for use herein are compounds of metals from Groups 1 and 2 of the of the Periodic Table of the Elements, such as salts of sodium or potassium and oxides or salts of magnesium or calcium, for instance the chlorides, sulphates, carbonates, phosphates or silicates of sodium, potassium, magnesium or calcium and the oxides or hydroxides of, for instance, magnesium or calcium. Also suitable for use are inorganic oxides such as silica, titania, alumina, zirconia, chromia, boron oxide, silanized silica, silica hydrogels, silica xerogels, silica aerogels, and mixed oxides such as talcs, silica/chromia, silica/chromia/titania, silica/alumina, silica/titania, silica/magnesia, silica/magnesia/titania, aluminum phosphate gels, silica co-gels and the like. The inorganic oxides may contain small amounts of carbonates, nitrates, sulfates and oxides such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$. Carriers containing at least one component selected from the group consisting of $MgCl_2$, $SiO_2$, $Al_2O_3$ or mixtures thereof as a main component are preferred.

Examples of suitable organic carriers include polymers such as, for example, polyethylene, polypropylene, interpolymers of ethylene and alpha-olefins, polystyrene, functionalized polystyrene, polyamides and polyesters.

In the event that the Ziegler-Natta catalyst is to be used in prepolymer form, the co-catalyst used to form the prepolymer can be any organometallic compound comprising a metal of Groups 1, 2, 11, 12, 13 and 14 of the above described Periodic Table of the Elements. Exemplary of such metals are lithium, magnesium, copper, zinc, boron, silicon and the like. When a prepolymer is employed in the polymerization medium additional co-catalyst(s), if utilized, may be the same or different as that utilized in preparing the prepolymer. When utilized, external electron donor(s) and/or halogenated hydrocarbon(s) can be added to the prepolymer.

The Ziegler-Natta catalyst may contain conventional components in addition to the transition metal component and the co-catalyst. For example, there may be added any magnesium compound, halogenated hydrocarbon and the like.

Furthermore there may be added to the Ziegler-Natta catalyst any electron donor. The electron donor compound preferably is selected from the group consisting of carboxylic acid esters, anhydrides, acid halides, ethers, thioethers, aldehydes, ketones, imines, amines, amides, nitriles, isonitriles, cyanates, isocyanates, thiocyanates, isothiocyanates, thioesters, dithioesters, carbonic esters, hydrocarbyl carbamates, hydrocarbyl thiocarbamates, hydrocarbyl dithiocarbamates, urethanes, sulfoxides, sulfones, sulfonamides, organosilicon compounds containing at least one oxygen atom, and nitrogen, phosphorus, arsenic or antimony compounds connected to an organic group through a carbon or oxygen atom. More preferred as electron donors are compounds containing from 1 to 50 carbon atoms and from 1 to 30 heteroatoms of an element, or mixtures thereof, selected from Groups 14, 15, 16 and 17 of the Periodic Table of Elements.

The Ziegler-Natta catalyst may be prepared by any method known in the art. The catalyst can be in the form of a solution, a slurry or a dry free flowing powder. The amount of Ziegler-Natta catalyst used is that which is sufficient to allow production of the desired amount of the polyolefin.

The polymerization reaction is carried out in the presence of dinitrogen monoxide ($N_2O$). It is essential that the dinitrogen monoxide be utilized in an amount that will be sufficient to result in the production of polyolefins characterized by having a molecular weight distribution narrower than would be obtained in the absence of utilizing the dinitrogen monoxide in the specified amount. The molecular weight distribution of the polyolefins herein is evidenced by the melt flow ratio (MFR) values of the polyolefins..

In the process of the present invention it has been found suitable to add, generally, to the polymerization medium dinitrogen monoxide ($N_2O$) in an amount from about 1 ppm to about 10,000 ppm by volume in order to produce polyolefins having narrowed molecular weight distributions.

Polyethylenes produced by the present process are not only characterized by narrower molecular weight distribution, but also, generally, a reduced n-hexane soluble polymeric fraction.

In carrying out the polymerization reaction of the present process there may be added other conventional additives generally utilized in processes for polymerizing olefins. Specifically there may be added any halogenated hydrocarbon, including those mentioned hereinbefore, and preferably, chloroform. Further, there may be added any external or internal electron donor, or mixtures of electron donors, such as those mentioned hereinbefore, and preferably, tetrahydrofuran.

Exemplary of the polymers that can be produced by the process of the present invention include the following:

A. Homopolymers of ethylene and interpolymers of ethylene and at least one or more alpha-olefins having 3 to 16 carbon atoms wherein ethylene comprises at least about 50% by weight of the total monomers involved;

B. Interpolymers of ethylene and 1-hexene wherein ethylene comprises at least about 50% by weight of the copolymer and have a differential scanning calorimetry (DSC) melt transition temperature, $T_m$, of about 116° C. to about 123° C., a density of about 0.880 g/cc to about 0.930 g/cc, a n-hexane extractable of from 0 to about 6 weight percent, and a melt flow ratio of about 26 to about 34;

C. Interpolymers of ethylene and 1-hexene having a DSC melt transition temperature, $T_m$, of about 119° C. to about 121° C., a density of about 0.905 g/cc to about 0.920 g/cc, a n-hexane extractable of from 0 to about 3 weight percent, and a melt flow ratio of about 26 to about 32;

D. Interpolymers of ethylene and an olefin having from 3 to 16 carbon atoms, wherein ethylene comprises at least 99% by weight of the copolymer, and the interpolymer has a melt flow ratio of from about 22 to about 26; and E. Interpolymers of ethylene and at least one or more olefin(s) having 5 to 16 carbon atoms, wherein ethylene comprises at least about 50% by weight of the interpolymer having a DSC melt transition temperature of about 1 16° C. to about 123° C., a density of from about 0.880 g/cc to about 0.930 g/cc, a n-hexane extractable of from 0 to about 6 weight percent, and a melt flow ratio of from about 26 to about 34.

Any conventional additive may be added to the polyolefins obtained by the present invention. Examples of the additives include nucleating agents, heat stabilizers, antioxidants of phenol type, sulfur type and phosphorus type, lubricants, antistatic agents, dispersants, copper harm inhibitors, neutralizing agents, foaming agents, plasticizers, anti-foaming agents, flame retardants, crosslinking agents, flowability improvers such as peroxides, ultraviolet light absorbers, light stabilizers, weathering stabilizers, weld strength improvers, slip agents, anti-blocking agents, anti-fogging agents, dyes, pigments, natural oils, synthetic oils, waxes, fillers and rubber ingredients.

The polyethylenes of the present invention may be fabricated into films by any technique known in the art. For example, films may be produced by the well known cast film, blown film and extrusion coating techniques.

Further, the polyethylenes may be fabricated into other articles of manufacture, such as molded articles, by any of the well known techniques.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLES

In the following examples the test procedures listed below were used in evaluating the analytical properties of the polyolefins herein and in evaluating the physical properties of the films of the examples.

a) Dart Impact is determined according to ASTM D-1709, Method A;

with a 38.1 mm dart, and a drop height of 0.66 meter. Film thickness of about 1 mil;

b) Density is determined according to ASTM D-4883 from a plaque made according to ASTM D1928;

c) Melt Index (MI), $I_2$, is determined in accord with ASTM D-1238, condition E, measured at 190° C., and reported as decigrams per minute;

d) High Load Melt Index (HLMI), $I_{21}$, is measured in accord with ASTM D-1238, Condition F, measured at 10.0 times the weight used in the melt index test above;

e) Melt Flow Ratio (MFR)=$I_{21}/I_2$ or High Load Melt Index/Melt Index; and f) n-Hexane Extractable - is determined in accordance with 21 CFR 177.1520 (Option 2). More particularly, an approximately 1 square inch film test specimen having a thickness≦4 mils weighing 2.5±0.05 grams is placed into a tared sample basket and accurately weighed to the nearest 0.1 milligram. The sample basket containing the test specimen is then placed in a 2-liter extraction vessel containing approximately 1 liter of n-hexane. The basket is placed such that it is totally below the level of n-hexane solvent. The sample resin film is extracted for 2 hours at 49.5 ±0.5° C. and then the basket is raised above the solvent level to drain momentarily. The basket is removed and the contents are rinsed by immersing several times in fresh n-hexane. The basket is allowed to dry between rinsing. The excess solvent is removed by briefly blowing the basket with a stream of nitrogen or dry air. The basket is placed in the vacuum oven for 2 hours at 80±5° C. After 2 hours, it is removed and placed in a desiccator to cool to room temperature (about 1 hour). After cooling, the basket is reweighed to the nearest 0.1 milligram. The percent n-hexane extractables content is then calculated from the weight loss of the original sample.

g) DSC Melt Transition Temperature ($T_M$) was determined according to ASTM D-3418-97. The transition, $T_M$, was measured on the second heat cycle.

The Ziegler-Natta catalyst used in Examples 1–7 herein was prepared in accordance with Example 1-a of European Patent Application EP 0 703 246 A1.

The prepolymer used in Examples 1–7 herein was prepared in accordance with Example 1-b of European Patent Application EP 0 703 246 A1. A prepolymer containing about 34 grams of polyethylene per millimole of titanium, with a tri-n-octylaluminum (TnOA) to titanium molar ratio of about 1.1, was thus obtained.

The polymerization process utilized in Examples 1–7 herein was carried out in a fluidized-bed reactor for gas-phase polymerization, consisting of a vertical cylinder of diameter 0.74 meters and height 7 meters and surmounted by a velocity reduction chamber. The reactor is provided in its lower part with a fluidization grid and with an external line for recycling gas, which connects the top of the velocity reduction chamber to the lower part of the reactor, at a point below the fluidization grid. The recycling line is equipped with a compressor for circulating gas and a heat transfer means such as a heat exchanger. In particular the lines for supplying ethylene, 1-hexene, hydrogen and nitrogen, which represent the main constituents of the gaseous reaction mixture passing through the fluidized bed, feed into the recycling line.

Above the fluidization grid, the reactor contains a fluidized bed consisting of about 800 pounds of a linear low-density polyethylene powder made up of particles with a weight-average diameter of about 0.7 mm. The gaseous reaction mixture, which contains ethylene, 1-hexene, hydrogen, nitrogen and minor amounts of other components, passes through the fluidized bed under a pressure of about 295 psig with an ascending fluidization speed of about 1.9 ft/s.

A catalyst is introduced intermittently into the reactor, the said catalyst containing magnesium, chlorine and titanium and having been converted beforehand to a prepolymer, as described above, containing about 34 grams of polyethylene per millimole of titanium and an amount of tri-n-octylaluminum (TnOA) such that the molar ratio, Al/Ti, is equal to about 1.1. The rate of introduction of the prepolymer into the reactor is adjusted to achieve the desired production rate. During the polymerization, a solution of trimethylaluminum (TMA) in n-hexane, at a concentration of about 2 weight percent, is introduced continuously into the line for recycling the gaseous reaction mixture, at a point situated downstream of the heat transfer means. The feed rate of TMA is expressed as a molar ratio of TMA to titanium (TMA/Ti), and is defined as the ratio of the TMA feed rate (in moles of TMA per hour) to the prepolymer feed rate (in moles of titanium per hour). Simultaneously, a solution of chloroform ($CHCl_3$) in n-hexane, at a concentration of about 0.5 weight percent, is introduced continuously into the line for recycling the gaseous reaction mixture. The feed rate of $CHCl_3$ is expressed as a molar ratio of $CHCl_3$ to titanium ($CHCl_3$/Ti), and is defined as the ratio of the $CHCl_3$ feed rate (in moles of $CHCl_3$ per hour) to the prepolymer feed rate (in moles of titanium per hour). Likewise, a solution of tetrahydrofuran (THF) in n-hexane, at a concentration of about 1 weight percent, can be introduced continuously into the line for recycling the gaseous reaction mixture. The feed rate of THF is expressed as a molar ratio of THF to titanium (THF/Ti), and is defined as the ratio of the THF feed rate (in moles of THF per hour) to the prepolymer feed rate (in moles of titanium per hour). In Examples 3–7 herein, dinitrogen monoxide ($N_2O$) was added as a gas to the line for recycling the gaseous reaction mixture in amounts sufficient to narrow the molecular weight distribution of the polyethylene. The concentration of $N_2O$ in the gas phase polymerization medium is expressed in units of parts per million (ppm) by volume. Copolymers of ethylene and 1-hexene, having densities of 0.917 g/cc, were manufactured at a rate of about 150 to about 200 pounds per hour in the following examples.

The productivity of the prepolymer (Productivity) is the ratio of pounds of polyethylene produced per pound of prepolymer added to the reactor. The activity of the catalyst is expressed as grams of polyethylene per millimole titanium per hour per 100 psia of ethylene pressure.

Example 1

The gas phase process conditions are given in Table 1 and the resin properties are given in Table 2. The molar ratio of trimethylaluminum (TMA) to titanium (TMA/Ti) was 3. The molar ratio of chloroform ($CHCl_3$) to titanium ($CHCl_3$/Ti) was 0.03. The operation was conducted without the addition of an external electron donor. 1-Hexene was used as comonomer. Under these conditions a polyethylene free from agglomerate was withdrawn from the reactor at a rate of 150 lb/h (pounds per hour). The productivity of the prepolymer was 375 pounds of polyethylene per pound of prepolymer which corresponds to an activity of 2311 grams of polyethylene per millimole of titanium per hour per 100 psia of ethylene partial pressure [gPE/(mmoleTi·h·100$P_{C2}$)].

The polyethylene had a density of 0.917 g/cc and a melt index $MI_{2.16}$, $I_2$, of 0.9 dg/min. The Melt Flow Ratio, $I_{21}/I_2$, was 33 and the n-hexane extractables were 2.6% by weight. The DSC melt transition temperature ($T_m$) was 124.5° C.

Example 2

The gas phase process conditions are given in Table 1 and the resin properties are given in Table 2. The molar ratio TMA/Ti was 7. The molar ratio $CHCl_3$/Ti was 0.06. The molar ratio of tetrahydrofuran (THF) to titanium (THF/Ti) was 1. 1-Hexene was used as comonomer. Under these conditions a polyethylene free from agglomerate was withdrawn from the reactor at a rate of 192 lb/h. The productivity of the prepolymer was 231 pounds of polyethylene per pound of prepolymer which corresponds to an activity of 1800 [gPE/(mmoleTi·h·100$P_{C2}$)].

The polyethylene had a density of 0.917 g/cc and a melt index $MI_{2.16}$, $I_2$, of 0.9 dg/min. The Melt Flow Ratio, $I_{21}/I_2$, was 31 and the n-hexane extractables were 2.0% by weight. The DSC melt transition temperature ($T_m$) was 123.9° C.

Example 3

The gas phase process conditions are given in Table 1 and the resin properties are given in Table 2. The molar ratio TMA/Ti was 7. The molar ratio $CHCl_3$/Ti was 0.06. The molar ratio THF/Ti was 1. The concentration of dinitrogen monoxide ($N_2O$) in the polymerization medium was 70 ppm by volume. 1-Hexene was used as comonomer. Under these conditions a polyethylene free from agglomerate was withdrawn from the reactor at a rate of 180 lb/h. The productivity of the prepolymer was 79 pounds of polyethylene per pound of prepolymer which corresponds to an activity of 609 [gPE/(mmoleTi·h·100$P_{C2}$)].

The polyethylene had a density of 0.917 g/cc and a melt index $MI_{2.16}$, $I_2$, of 0.9 dg/min. The Melt Flow Ratio, $I_{21}/I_2$, was 28 and the n-hexane extractables were 1.1% by weight. The DSC melt transition temperature ($T_m$) was 122.3° C.

Example 4

The gas phase process conditions are given in Table 1 and the resin properties are given in Table 2. The molar ratio TMA/Ti was 7. The molar ratio $CHCl_3$/Ti was 0.06. The molar ratio THF/Ti was 0. The concentration of $N_2O$ in the polymerization medium was 130 ppm by volume. 1-Hexene was used as comonomer. Under these conditions a polyethylene free from agglomerate was withdrawn from the reactor at a rate of 211 lb/h. The productivity of the prepolymer was 121 pounds of polyethylene per pound of prepolymer which corresponds to an activity of 1116 [gPE/(mmoleTi·h·100$P_{C2}$)].

The polyethylene had a density of 0.917 g/cc and a melt index $MI_{2.16}$, $I_2$, of 0.9 dg/min. The Melt Flow Ratio, $I_{21}/I_2$, was 28 and the n-hexane extractables were 1.6% by weight. The DSC melt transition temperature ($T_m$) was 122.7° C.

Example 5

The gas phase process conditions are given in Table 1 and the resin properties are given in Table 2. The molar ratio TMA/Ti was 7. The molar ratio $CHCl_3$/Ti was 0.06. The molar ratio THF/Ti was 0. The concentration of $N_2O$ in the polymerization medium was 210 ppm by volume. 1-Hexene was used as comonomer. Under these conditions a polyethylene free from agglomerate was withdrawn from the reactor at a rate of 194 lb/h. The productivity of the prepolymer was 124 pounds of polyethylene per pound of prepolymer which corresponds to an activity of 1038 [gPE/(mmoleTi·h·100$P_{C2}$)].

The polyethylene had a density of 0.917 g/cc and a melt index $MI_{2.16}$, $I_2$, of 0.9 dg/min. The Melt Flow Ratio, $I_{21}/I_2$, was 28 and the n-hexane extractables were 1.1% by weight. The DSC melt transition temperature ($T_m$) was 122.2° C.

Example 6

The gas phase process conditions are given in Table 1 and the resin properties are given in Table 2. The molar ratio TMA/Ti was 7. The molar ratio $CHCl_3$/Ti was 0.06. The molar ratio THF/Ti was 0.3. The concentration of $N_2O$ in the polymerization medium was 300 ppm by volume. 1-Hexene was used as comonomer. Under these conditions a polyethylene free from agglomerate was withdrawn from the reactor at a rate of 192 lb/h. The productivity of the prepolymer was 83 pounds of polyethylene per pound of prepolymer which corresponds to an activity of 471 [gPE/(mmoleTi·h·100$P_{C2}$)].

The polyethylene had a density of 0.917 g/cc and a melt index $MI_{2.16}$, $I_2$, of 0.9 dg/min. The Melt Flow Ratio, $I_{21}/I_2$, was 27 and the n-hexane extractables were 0.8% by weight. The DSC melt transition temperature ($T_m$) was 120.0° C.

Example 7

The gas phase process conditions are given in Table 1 and the resin properties are given in Table 2. The molar ratio TMA/Ti was 7. The molar ratio $CHCl_3$/Ti was 0.06. The molar ratio THF/Ti was 0.3. The concentration of $N_2O$ in the polymerization medium was 300 ppm by volume. 1-Hexene was used as comonomer. Under these conditions a polyethylene free from agglomerate was withdrawn from the reactor at a rate of 174 lb/h. The productivity of the prepolymer was 91 pounds of polyethylene per pound of prepolymer which corresponds to an activity of 470 [gPE/(mmoleTi·h·100$P_{C2}$)].

The polyethylene had a density of 0.917 g/cc and a melt index $MI_{2.16}$, $I_2$, of 0.6 dg/min. The Melt Flow Ratio, $I_{21}/I_2$, was 28 and the n-hexane extractables were 0.5% by weight. The DSC melt transition temperature ($T_m$) was 119.5° C.

TABLE 1

Reactor Conditions for Examples 1 through 7

| | Example | | | | | | |
|---|---|---|---|---|---|---|---|
| | 1 | 2 | 3 | 4 | 5 | 6 | 7 |
| Reactor Pressure (psig) | 290 | 296 | 295 | 294 | 295 | 297 | 296 |
| Reactor Temperature (° C.) | 84 | 84 | 84 | 84 | 84 | 86 | 86 |
| Fluidization Velocity (ft/sec) | 1.8 | 1.9 | 1.9 | 1.9 | 1.9 | 1.8 | 1.8 |
| Fluidized Bulk Density (lb/ft$^3$) | 17.0 | 17.8 | 17.1 | 17.5 | 16.7 | 15.2 | 14.9 |
| Reactor Bed Height (ft) | 9.4 | 10.2 | 10.2 | 10.0 | 10.4 | 12.8 | 12.9 |
| Ethylene (mole %) | 38 | 32 | 32 | 32 | 32 | 41 | 41 |
| $H_2/C_2$ (molar ratio) | 0.178 | 0.157 | 0.140 | 0.113 | 0.110 | 0.080 | 0.063 |
| $C_6/C_2$ (molar ratio) | 0.191 | 0.153 | 0.138 | 0.128 | 0.124 | 0.115 | 0.112 |
| TMA/Ti (molar ratio) | 3 | 7 | 7 | 7 | 7 | 7 | 7 |
| $CHCl_3$/Ti | 0.03 | 0.06 | 0.06 | 0.06 | 0.06 | 0.06 | 0.06 |
| THF/Ti (molar ratio) | 0 | 1 | 1 | 0 | 0 | 0.3 | 0.3 |
| $N_2O$ (ppm by volume) | 0 | 0 | 70 | 130 | 210 | 300 | 300 |
| Prepolymer Rate (lb/h) | 0.4 | 0.83 | 2.29 | 1.74 | 1.56 | 2.30 | 1.92 |
| Production Rate (lb/h) | 150 | 192 | 180 | 211 | 194 | 192 | 174 |
| Productivity (mass ratio) | 375 | 231 | 79 | 121 | 124 | 83 | 91 |
| Space Time Yield (lb/h·ft$^3$) | 3.6 | 4.0 | 3.8 | 4.6 | 4.0 | 3.2 | 2.9 |
| Activity* | 2311 | 1800 | 609 | 1116 | 1038 | 471 | 470 |
| Residual Titanium (ppm) | 3.8 | 5.9 | 17.5 | 11.3 | 11.0 | 16.9 | 15.6 |

*units of grams PE/(mmoleTi-h-100$P_{C2}$)

TABLE 2

Resin Properties for LLDPE prepared in Examples 1 through 7

| | Example | | | | | | |
|---|---|---|---|---|---|---|---|
| | 1 | 2 | 3 | 4 | 5 | 6 | 7 |
| Density (g/cc) | 0.917 | 0.917 | 0.917 | 0.917 | 0.917 | 0.917 | 0.917 |
| Melt Index, $I_2$ (dg/min) | 0.9 | 0.9 | 0.9 | 0.9 | 0.9 | 0.9 | 0.6 |
| Melt Flow Ratio ($I_{21}/I_2$) | 33 | 31 | 28 | 28 | 28 | 27 | 28 |
| n-Hexane Extractable (wt %) | 2.9 | 2.0 | 1.1 | 1.6 | 1.1 | 0.8 | 0.5 |

TABLE 2-continued

Resin Properties for LLDPE prepared in Examples 1 through 7

| | Example | | | | | | |
|---|---|---|---|---|---|---|---|
| | 1 | 2 | 3 | 4 | 5 | 6 | 7 |
| DSC Melt Trans., $T_M$ (° C.) | 124.5 | 123.9 | 122.3 | 122.7 | 122.2 | 120.0 | 119.5 |
| Dart Impact (g/mil) | 200 | 330 | 380 | 400 | 580 | 1750 | >2000 |

From the above data in the Examples and Tables 1 and 2 the following observations may be made. The addition of $N_2O$ caused a narrowing of the molecular weight distribution as evidenced by the reduction in the melt flow ratio ($I_{21}/I_2$) values, caused a reduction in the n-hexane soluble polymeric fraction (wt % extractable), and caused a reduction in the DSC melt transition temperature ($T_m$) of the polyethylenes.

The combination of narrowed molecular weight distribution, reduced n-hexane extractables, and reduced DSC melt transition temperature ($T_m$) is indicative of a reduction of the compositional heterogeneity in the polyethylene.

Films prepared from the polyethylenes of the present invention are generally characterized as having improved optical properties and improved strength properties which are particularly shown by the values of Dart Impact in Table 2.

Any conventional additive may be added to the polyolefins obtained by the present invention. Examples of the additives include nucleating agents, heat stabilizers, antioxidants of phenol type, sulfur type and phosphorus type, lubricants, antistatic agents, dispersants, copper harm inhibitors, neutralizing agents, foaming agents, plasticizers, anti-foaming agents, flame retardants, crosslinking agents, flowability improvers such as peroxides, ultraviolet light absorbers, light stabilizers, weathering stabilizers, weld strength improvers, slip agents, anti-blocking agents, anti-fogging agents, dyes, pigments, natural oils, synthetic oils, waxes, fillers and rubber ingredients.

Articles such as molded items can also be prepared from the polyethylenes of the present invention.

In similar fashion polyolefins may be produced using any of the other compounds described herein. It is expected that the resultant polyolefins will likewise exhibit narrowed molecular weight distributions.

It should be clearly understood that the forms of the invention herein described are illustrative only and are not intended to limit the scope of the invention. The present invention includes all modifications falling within the scope of the following claims.

We claim:

1. A process for polymerizing at least one or more olefin(s) comprising contacting, under polymerization conditions, the at least one or more olefin(s) with at least one Ziegler-Natta catalyst comprised of a component comprising at least one transition metal and a co-catalyst comprising at least one organometallic compound, and dinitrogen monoxide ($N_2O$), wherein the dinitrogen monoxide is present in an amount sufficient that the molecular weight distribution of the resulting polymeric product is narrower than would be obtained in the absence of the dinitrogen monoxide.

2. The process according to claim 1 wherein the at least one transition metal is selected from Groups 4, 5, 6, 7, 8, 9 and 10 of the Periodic Table of the Elements, as defined herein.

3. The process according to claim 2 wherein the transition metal is selected from the group consisting of titanium, zirconium, vanadium, iron, chromium, nickel and mixtures thereof.

4. The process according to claim 3 wherein the metal is selected from the group consisting of titanium, zirconium, vanadium and mixtures thereof.

5. The process according to claim 1 wherein the metal of the at least one organometallic compound is selected from Groups 1, 2, 11, 12, 13 and 14 of the Periodic Table of the Elements, as defined herein.

6. The process according to claim 5 wherein the at least one organometallic compound has the formula, $$X_n ER_{3-n},$$

or mixtures thereof,
wherein
X is hydrogen, halogen, or mixtures of halogens, selected from fluorine, chlorine, bromine and iodine,
n ranges from 0 to 2,
E is an element from Group 13 of the Periodic Table of Elements, and
R is a hydrocarbon group, containing from 1 to 100 carbon atoms and from 0 to 10 oxygen atoms, connected to the Group 13 element by a carbon or oxygen bond.

7. The process according to claim 5 wherein the organometallic compound is selected from the group consisting of trialkylaluminums, dialkylaluminum halides and alkylaluminum sesquihalides.

8. The process according to claim 7 wherein the trialkylaluminum is selected from the group consisting of trimethylaluminum, triethylaluminum, tri-n-propylaluminum, tri-n-butylaluminum, triisobutylaluminum, tri-n-hexylaluminum, triisohexylaluminum, tri-2-methylpentylaluminum, and tri-n-octylaluminum, the dialkylaluminum halide is selected from the group consisting of dimethylaluminum chloride, diethylaluminum chloride, dibutylaluminum chloride, and diisobutylaluminum chloride, and the alkylaluminum sesquihalide is selected from the group consisting of methylaluminum sesquichloride, ethylaluminum sesquichloride, n-butylaluminum sesquichloride, and isobutylaluminum sesquichloride.

9. The process according to claim 8 wherein the trialkylaluminum is selected from the group consisting of trimethylaluminum and triethylaluminum.

10. The process according to claim 1 further comprising the presence of at least one electron donor.

11. The process according to claim 10 wherein at least one of the electron donors is tetrahydrofuran.

12. The process according to claim 1 further comprising the presence of at least one halogenated hydrocarbon.

13. The process according to claim 12 wherein at least one of the halogenated hydrocarbons is chloroform.

14. The process according to claim 1 further comprising the presence of at least one electron donor and at least one halogenated hydrocarbon.

15. The process according to claim 14 wherein the co-catalyst is trimethylaluminum, the electron donor is tetrahydrofuran and the halogenated hydrocarbon is chloroform.

16. The process according to claim 15 wherein the transition metal is titanium.

17. The process according to claim 1 wherein the dinitrogen monoxide is present in the polymerization medium in an amount ranging from about 1 ppm to about 10,000 ppm by volume.

18. The process according to claim 1 wherein the polymerization conditions are gas phase.

19. The process according to claim 1 wherein the polymerization conditions are solution phase.

20. The process according to claim 1 wherein the polymerization conditions are slurry phase.

21. The process according to claim 1 wherein at least one olefin is ethylene.

22. A process for narrowing molecular weight distribution of a polymer comprising at least one or more olefin(s) comprising contacting under polymerization conditions, the at least one or more olefin(s) with at least one Ziegler-Natta catalyst comprised of a component comprising at least one transition metal and a co-catalyst comprising at least one organometallic compound, and dinitrogen monoxide ($N_2O$), wherein the dinitrogen monoxide is present in an amount sufficient that the molecular weight distribution of the resulting polymeric product is narrower than would be obtained in the absence of the dinitrogen monoxide.

23. The process according to claim 22 wherein the at least one transition metal is selected from Groups 4, 5, 6, 7, 8, 9 and 10 of the Periodic Table of the Elements, as defined herein.

24. The process according to claim 23 wherein the transition metal is selected from the group consisting of titanium, zirconium, vanadium, iron, chromium, nickel and mixtures thereof.

25. The process according to claim 24 wherein the metal is selected from the group consisting of titanium, zirconium, vanadium and mixtures thereof.

26. The process according to claim 22 wherein the metal of the at least one organometallic compound is selected from Groups 1, 2, 11, 12, 13 and 14 of the Periodic Table of the Elements, as defined herein.

27. The process according to claim 26 wherein the at least one organometallic compound has the formula, $$X_nER_{3-n},$$

or mixtures thereof,
wherein
X is hydrogen, halogen, or mixtures of halogens, selected from fluorine, chlorine, bromine and iodine,
n ranges from 0 to 2,
E is an element from Group 13 of the Periodic Table of Elements, and
R is a hydrocarbon group, containing from 1 to 100 carbon atoms and from 0 to 10 oxygen atoms, connected to the Group 13 element by a carbon or oxygen bond.

28. The process according to claim 26 wherein the organometallic compound is selected from the group consisting of trialkylaluminums, dialkylaluminum halides and alkylaluminum sesquihalides.

29. The process according to claim 28 wherein the trialkylaluminum is selected from the group consisting of trimethylaluminum, triethylaluminum, tri-n-propylaluminum, tri-n-butylaluminum, triisobutylaluminum, tri-n-hexylaluminum, triisohexylaluminum, tri-2-methylpentylaluminum, and tri-n-octylaluminum, the dialkylaluminum halide is selected from the group consisting of dimethylaluminum chloride, diethylaluminum chloride, dibutylaluminum chloride, and diisobutylaluminum chloride, and the alkylaluminum sesquihalide is selected from the group consisting of methylaluminum sesquichloride, ethylaluminum sesquichloride, n-butylaluminum sesquichloride and isobutylaluminum sesquichloride.

30. The process according to claim 29 wherein the trialkylaluminum is selected from the group consisting of trimethylaluminum and triethylaluminum.

31. The process according to claim 22 further comprising the presence of at least one electron donor.

32. The process according to claim 31 wherein at least one of the electron donors is tetrahydrofuran.

33. The process according to claim 22 further comprising the presence of at least one halogenated hydrocarbon.

34. The process according to claim 33 wherein at least one of the halogenated hydrocarbons is chloroform.

35. The process according to claim 22 further comprising the presence of at least one electron donor and at least one halogenated hydrocarbon.

36. The process according to claim 35 wherein the organometallic co-catalyst compound is trimethylaluminum, the electron donor is tetrahydrofuran and the halogenated hydrocarbon is chloroform.

37. The process according to claim 36 wherein the transition metal is titanium.

38. The process according to claim 22 wherein the dinitrogen monoxide is present in the polymerization medium in an amount ranging from about 1 ppm to about 10,000 ppm by volume.

39. The process according to claim 22 wherein the polymerization conditions are gas phase.

40. The process according to claim 22 wherein the polymerization conditions are solution phase.

41. The process according to claim 22 wherein the polymerization conditions are slurry phase.

42. The process according to claim 22 wherein at least one olefin is ethylene.

* * * * *